United States Patent [19]
Kim

[11] 3,883,307
[45] May 13, 1975

[54] GAS ANALYZER RESISTANCE ELEMENT
[75] Inventor: Young Ho Kim, Palo Alto, Calif.
[73] Assignee: Ambac Industries Inc., Garden City, N.Y.
[22] Filed: Dec. 19, 1973
[21] Appl. No.: 426,035

Related U.S. Application Data
[63] Continuation-in-part of Ser. No. 191,170, Oct. 21, 1971, abandoned.

[52] U.S. Cl. ............. 23/254 E; 117/227; 117/231; 252/466 PT; 252/473; 252/477
[51] Int. Cl. .................. B01j 11/08; G01n 31/12
[58] Field of Search .......... 23/254 E, 232 E, 255 E, 23/288 J; 117/100 B, 217, 227, 231; 252/466 PT, 473, 477

[56] References Cited
UNITED STATES PATENTS

| | | | |
|---|---|---|---|
| 2,731,541 | 1/1956 | Hoodry et al. | 252/477 R |
| 2,890,971 | 6/1959 | Arnold et al. | 117/231 X |
| 3,251,654 | 5/1966 | Palmer | 23/255 E |
| 3,361,682 | 1/1968 | Keith et al. | 252/477 R X |
| 3,518,207 | 6/1970 | Hagy et al. | 252/466 PT |
| 3,554,929 | 1/1971 | Aarons | 252/477 R X |
| 3,794,588 | 2/1974 | Stiles | 252/466 PT X |

*Primary Examiner*—Robert M. Reese
*Attorney, Agent, or Firm*—Robert R. Thornton

[57] ABSTRACT

A catalytic resistance element for use in a gas analyzer has an outer layer formed of particles of a metallic oxide, such as beryllium or aluminum, of about one micron average size, the outer layer preferably being of from about 100 to about 500 microns in thickness. The oxide particles have catalytic coatings formed by mixing the particles with a solution of a compound which is decomposed by heating to coat the particles with the catalyst and heating the mixture to cause such decomposition and coating. The outer layer is applied by mixing the oxide particles with binder solution, and applying drops of the mixture to the resistance element.

16 Claims, 5 Drawing Figures

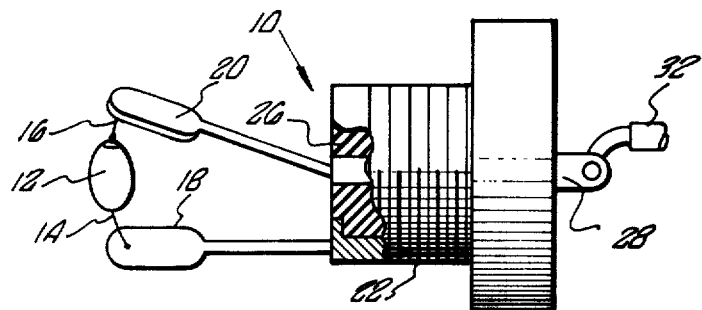
FIG_1_
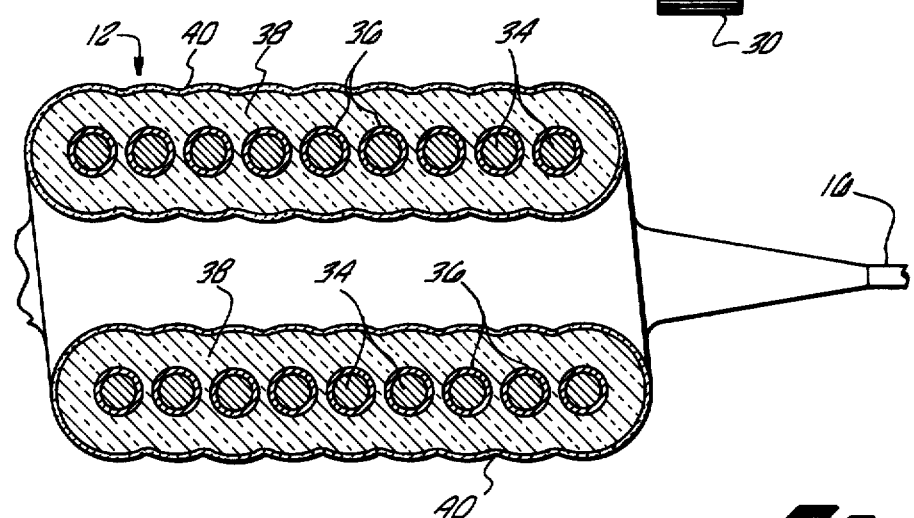
FIG_2_
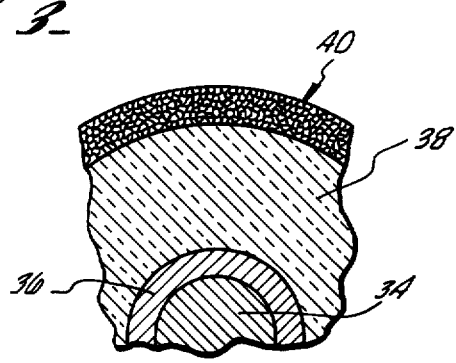
FIG_3_
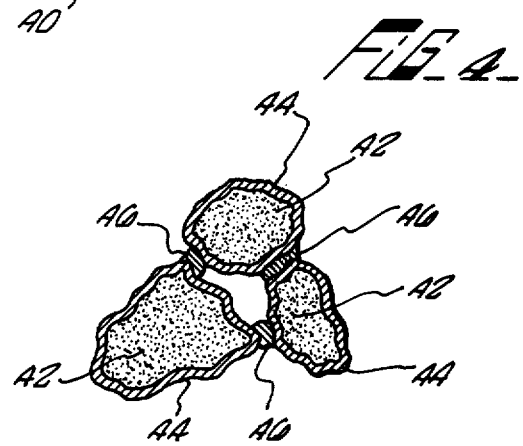
FIG_4_
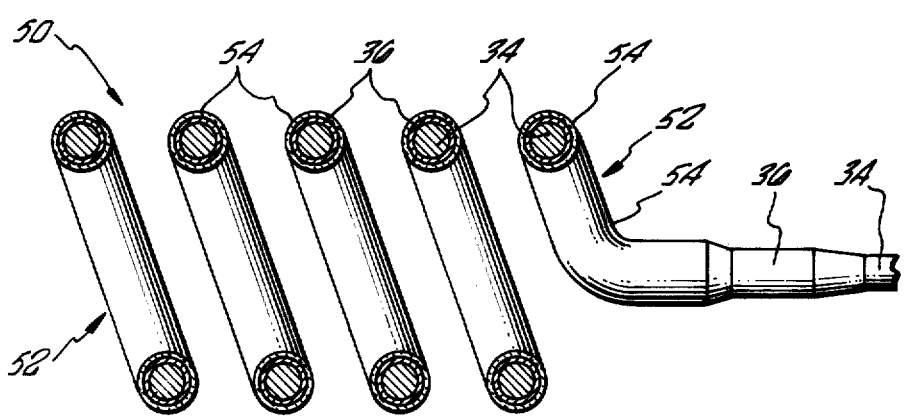
FIG_5_

GAS ANALYZER RESISTANCE ELEMENT

CROSS-REFERENCE TO RELATED APPLICATION

This application is a continuation-in-part of U.S. Pat. application Ser. No. 191,170, filed Oct. 21, 1971, for Gas Analyzer Resistance Element, Young Ho Kim, inventor now abandoned.

BACKGROUND OF THE INVENTION

1. Field of the Invention

The present invention relates to resistance elements for use in catalytic combustion type gas analyzers and constitutes an improvement over the resistance elements described and claimed in U.S. Pat. No. 3,586,486 issued June 22, 1971, Young Ho Kim and John N. Pattison, inventors, and assigned to AMBAC Industries, Inc., Garden City, New York, the assignee of the present invention.

2. Description of the Prior Art

In the aforesaid U.S. Pat. No. 3,586,486, there is described and claimed a structure for resistance elements for use in Wheatstone bridge type gas analyzers, which utilizes a filament formed for an electrical conductor whose electrical resistance varies with temperature, a glass seal about the electrical conductor, and a coating formed on the glass seal, the coating being a layer of an oxide of a metal from the class of metals consisting of aluminum and beryllium. When the resistance element is to be utilized as a catalytic element, a catalytic coating is formed on the oxide layer. This coating, which is in the form of a film enclosing the oxide layer, constitutes the surface area of the catalyst which is available to catalyze the combustion reaction. Consequently, since the resistance element may be quite small, typically less than 1/16 inch in diameter, the actual surface area available to catalyze the combustion reaction is relatively small. In many instances, it has been found that this relatively small surface area is the limiting factor in the reaction and an increase in catalytic surface area would provide greater linearity of analyzer response, particularly with respect to high concentrations or low flow rates of sample.

SUMMARY OF THE INVENTION

According to the present invention, to provide a greater catalytic surface area for a given size of element, the catalytic combustion resistance element has an outer catalytic layer formed by mixing the catalytically coated aluminum or beryllium oxide particles, of an average size of about 1 micron, with a binder solution, such as a nitrate of the chemical metal in the oxide, and applying this mixture to the resistance element so as to form an outer layer of catalytically coated oxide particles. The outer layer preferably has a thickness of from about 100 microns to about 500 microns. The binder solution, upon drying, provides a binder which holds the catalytically coated oxide particles to the resistance element and to one another, and provides a porous outer layer of the catalytically coated oxide particles, so as to permit contact between the gas sample and the catalyst not only at the surface of the outer layer but also within the thickness of the outer layer.

In its method aspects, broadly considered, the present invention consists of forming a catalytic coating on a resistance element by coating individual aluminum or beryllium oxide particles with the catalyst, mixing the coated particles with a binder medium, applying this mixture to the resistance element so as to form, when dried, a porous catalytic coating thereon of a thickness much greater than the average oxide particle size, and drying the mixture on the resistance element to form the coating. As the preferred structural embodiment utilizes aluminum oxide particles and platinum as the catalyst, the aluminum oxide particles are individually coated with platinum by mixing the particles with a solution of chloroplatinic acid and heating the mixture to cause the chloroplatinic acid to decompose and plate the particles with platinum.

BRIEF DESCRIPTION OF THE DRAWING

The present invention may be more readily understood by referring to the accompanying drawing, in which:

FIG. 1 is a view, partially in section, of a resistance element according to the present invention, illustrating its support and electrical connections;

FIG. 2 is a view, in section, of a resistance element, according to the present invention;

FIG. 3 is a partial sectional view illustrating the construction of a catalytic combustion resistance element, according to the present invention;

FIG. 4 is an idealized schematic representation of three of the particles of aluminum or beryllium oxide in a catalytic combustion resistance element, according to the invention; and FIG. 5 is a view, in section, of an alternate embodiment of resistance, according to the present invention.

DESCRIPTION OF THE PREFERRED EMBODIMENTS

A catalytic resistance element fitting 10 is shown in side elevation, partially in section, in FIG. 1. The fitting 10 includes a catalytic combustion resistance element 12. Extending outwardly from either end of the resistance element 12 are support wires 14, 16 which, preferably, are electrical resistance wires of the same composition as the electrical resistance element and, simply, a continuation thereof. The resistance and support wires 14, 16 are spot welded to support arms 18, 20 respectively. The support arms are also electrical conductors but not of the resistance type. The support arms extend to a base fitting 22 which is shown as threaded so as to engage an aperture in a reaction chamber wall of a gas analyzer (not shown). One of the support arms, the support arm 18 shown in FIG. 1, is connected directly to a base 22. In this embodiment, the base 22 is an electrical conductor, as is the reaction chamber wall, and so provides a common ground connection. In such an embodiment, the support arm 20 extends through the hollow central portion of the base 22 and is held in position by means of a suitable insulating material 26. The support arm 20 terminates in an electrical terminal 28 which is insulated from a base flange 30 of the fitting 10. The base flange 30 serves to seal the O-ring against the wall of the reaction chamber. The electrical terminal 28 has the lead 32 connected to it by any appropriate means, such as by soldering.

FIG. 2 is a view in section, greatly enlarged, of a typical resistance element 12 according to the invention. An electrical conductor of the electrical resistance type is formed into a helical filament 34 by an appropriate means. For example, the electrical conductor, conventionally wire, may be wound about a mandrel of suitable diameter. Preferably, prior to being wound about the mandrel, the electrical conductor has a ceramic coating 36 formed about it to aid in preventing shorting between adjacent turns. After having been formed into the helical configuration, the wire is removed from the mandrel, and a coating of molten glass is applied to the filament, so as to form an insulating layer 38. The glass provides insulation between adjacent wire turns, as well as providing rigidity to the helical structure, so as to hold the wires apart from each other. However, the principal function of the glass seal so formed is to inhibit, if not eliminate, the loss of conductor material by evaporation. A layer 40 of catalytically coated particles of an oxide of either beryllium or aluminum is then formed upon the glass insulating layer to provide an outer catalytic layer.

Referring to FIG. 3, there is shown a partial sectional view of the catalytic combustion resistance element 12, illustrating in greater detail the surface structure of the outer catalytic layer. As will be seen in FIG. 3, the glass coating layer 38 is completely enclosed by the outer catalytic layer 40. However, rather than constituting a film of the catalyst enveloping the glass layer 38, the outer catalytic layer is made up of many particles of aluminum or beryllium oxide, each one of which is coated with the catalyst, and adjacent ones of which are held together by a binder medium. The outer catalytic layer 40 thus constitutes a unitary structure which completely encloses the glass coating, but permits, through its porosity, a gas sample being analyzed not only to contact the exterior surface of the outer catalytic layer 40, but also to pass into the porous interior of the outer catalytic layer 40 so as to greatly increase the effective surface area of the catalyst.

FIG. 4 is an idealized schematic representation, in section, of three particles 42 of beryllium or aluminum oxide, coated with a catalyst 44, and adhering together by reason of a binder 46. FIG. 4 is a two dimensional representation of this adhering relationship, and it will be apparent that, in a three dimensional relationship, the porous interior of the outer layer consists of thousands of interconnecting passages which communicate with the outer surface of the outer layer, so as to provide for passage of the gas sample through the outer surface into the interior of the outer layer, and thereby greatly increasing the effective surface area of the platinum catalyst.

Insofar as the present invention is concerned, the glass seal 38, while utilized in the preferred embodiment as described hereinabove in order to reduce filament evaporation is not requisite to the practice of the invention, assuming that the advantages which the glass seal provides are not desired. Consequently, for the reasons set out herein, the outer catalytic layer may be applied directly to the ceramic coating throughout its entire length. In FIG. 5, there is shown an alternative embodiment of the catalytic combustion element 50. The catalytic combustion element 50 is generally similar to the catalytic combustion element 12, except that the glass seal 38 has been omitted, and the outer catalytic layer is formed directly on the ceramic coating on the wire. Thus, in FIG. 5, the catalytic element 50 has an helical filament 52, which consists of the electrical resistance wire 34, having the ceramic coating 36 formed thereabout. Within the helical portion of the element 50, the ceramic coating 36 is covered by an outer catalytic layer 54. The outer catalytic layer 54 is formed in the same manner as that described heretofore with respect to the outer catalytic layer 40.

In order to manufacture the resistance element of the present invention, resistance elements described in the aforesaid U.S. Pat. No. 3,506,486 may be utilized. However, the outer layers described therein are replaced by the outer catalytic layer 40 of the present invention in the catalytic element. Preferably, this outer catalytic layer consists of particles of aluminum or beryllium oxide, of about one micron average size. The individual particles are coated with the catalyst, which, for the utilization described in the aforesaid patent, may be platinum, palladium, or a mixture thereof. The individual particles are held together by a binder, which also binds the outer layer to the inner glass seal. Examples of the binder are nitrates of aluminum and beryllium.

In the preferred embodiments, aluminum oxide particles and a platinum catalyst are utilized. In order to coat the aluminum oxide particles with platinum, a mixture of chloroplatinic acid and aluminum oxide is heated, causing the chloroplatinic acid to decompose and coat the aluminum oxide particles with platinum. The preferred size of particles of aluminum oxide is about one micron. In order to avoid waste of platinum, it is therefore desirable initially to utilize aluminum oxide particles of this size in the mixture with chloroplatinic acid. In one method of producing oxide particles of the desired size, the oxide is ground into a powder by any conventional means, such as mortar and pestle. The resulting powder is mixed with distilled water, shaken well, and allowed to stand for fifteen minutes. The oxide particles which have settled out at the end of the fifteen minute period are discarded. The remaining mixture is again shaken, and allowed to stand for fifteen additional minutes. The oxide particles which have settled out during this additional fifteen minute period are discarded, and the mixture is allowed to settle for five additional minutes. The oxide particles which have settled out during this five additional minute period are removed from the aqueous mixture for use as the oxide particles for the resistance element. If desired, this material may be washed prior to further processing to remove any excess of undersized particles. It has been found that the average particle size of oxide so processed is approximately one micron, which is the size desired for use with the resistance element.

Aluminum oxide, when so processed, is then dried, and mixed with a 20% solution of chloroplatinic acid ($H_2PtCl_6 \cdot 6\,H_2O$). Preferably, the aluminum oxide and aqueous solution of chloroplatinic acid are mixed together in successive steps. Initially, the aluminum oxide and chloroplatinic acid solution are mixed in the ratio of one gram of aluminum oxide per 1.25 cubic centimeters of 20% chloroplatinic acid solution. This mixture is then dried, and heated to decompose the chloroplatinic acid so as to form a coating of platinum on the aluminum oxide particles. The resulting dried powder is then again mixed with 1.25 cubic centimeters of 20% chloroplatinic acid solution, and the process repeated until a total of 7½ cubic centimeters of 20% chloroplatinic acid solution have been added to each one gram of aluminum oxide. After completion of these steps, the final resulting powder is heated at a temperature of 2,000° Fahrenheit to assure adherence to the platinum to the surface of the aluminum oxide particles.

After this final heating of the platinum coating the aluminum oxide particles, the aluminum oxide particles are ready for application to the resistance element to form a catalytic element. The aluminum oxide particles will not, of themselves, adhere to the glass seal or to one another. Therefore, it is necessary to add to a binder material which will cause the aluminum oxide particles to adhere together and to the glass seal to form a relatively uniform outer layer for the resistance element. It has been found that, as a binding agent, a 35% aqueous solution of aluminum nitrate provides an effective binding agent, the aluminum nitrate concentration being determined according to the crystalline formula for aluminum nitrate, i.e. $AL(NO_3)_3 \cdot 9H_2O$. A mixture of this aqueous solution of aluminum nitrate and platinum coated aluminum oxide particles is made, in the proportions of 2.5 cubic centimeters of 35% aluminum nitrate solution per original one gram of aluminum oxide. The resulting mixture is then shaken to assure good uniformity, and applied to the resistance element, as individual drops of mixture, in sufficient quantity to produce an outer layer of platinum coated aluminum oxide particles of a thickness of from about 100 to about 500 microns when dried. The outer layer is then dried, assuring good adherence of the catalyst coated oxide particles to one another and to the glass layer. While, of course, other thicknesses can be utilized, it has been found that thicknesses within the foregoing range are optimum.

In utilizing either of the aforedescribed catalytic combustion resistance element in a gas analyzer, it is preferable to provide a compensating element which closely matches the characteristics of the catalytic element with respect to its outer surface, in order to assure accuracy of compensation. To make such a compensating element, the processing of the one micron average size aluminum oxide particles with chloroplatinic acid is eliminated, and rather than the 35% aluminum nitrate solution, the particles are mixed with a saturated aluminum nitrate solution, in the proportions of five cubic centimeters of solution per gram of aluminum oxide. The outer layer thickness on the compensating element should correspond to the outer layer thickness of the catalytic element.

In addition to the increase in surface area for the catalyst provided by the resistance element of the present invention, catalytic resistance elements utilizing the present invention are easier to manufacture and more reliable than elements manufactured generally in accordance with the description of U.S. Pat. No. 3,586,486. One of the difficulties which is encountered in manufacturing catalytic resistance elements having a structure shown in the aforesaid patent, i.e. a film or coating of catalytic material completely enclosing the element, is that of shorting out the element itself in attempting to coat the element with catalyst, as the catalyst is a conductor. For example, when a chloroplatinic acid solution is utilized with the element structure shown in the aforesaid patent, and coating is attempted by immersion of the element in the solution, the solution will penetrate through any ceramic coating which covers the leads of the element, thereby producing a short circuit across the element, so that the element becomes useless. However, by the present invention, the chloroplatinic acid solution does not contact the conductor portion of the resistance element, or any insulation on the element leads, at any time. Rather, the mixture applied to the element, in order to provide the catalytic coating, is of platinum coated oxide particles and aluminum nitrate solution, neither of which penetrate the glass seal in the preferred embodiment or the ceramic insulation on the conductor or the conductor leads to produce a short circuit. Thereby, the possibility of short circuit in operation is eliminated and the manufacturing procedure for such catalytic elements is greatly simplified.

The foregoing description of the preferred embodiment of practice of the present invention is set out particularly with respect to providing a catalytic resistance element using platinum as a catalyst and aluminum oxide as the catalyst carrying medium. However, in its broadest aspects, the method of the invention contemplates coating small particles of any catalyst carrying medium individually with the catalyst. Such coating is accomplished by selecting a composition of the catalyst which will decompose upon heating to produce the catalyst itself, mixing a solution of this composition with the particles of the catalyst carrying medium, heating this mixture so as to decompose the composition and coat the particles with the catalyst, mixing the catalyst coated particles with a binder medium, applying this mixture of particles and binder to the resistance element to produce an outer layer of catalyst coated particles and drying the outer layer to provide adherence of the particles to one another and to the element.

Therefore, as will be understood by those skilled in the art, the composition of catalyst utilized initially may be any composition of any desired catalytic material, so long as the composition will decompose upon heating at comparatively low temperatures, i.e., below 2,000° F, to produce the catalyst in a form which will coat the particles. The catalyst itself is not limited to platinum or any single element. Likewise, while aluminum nitrate is given in the example as a specific binder medium, any other appropriate binder material may be utilized. The important characteristic of the binder is that in producing adherence, it does not shield the catalytic coating from the gas sample. Furthermore, while it is preferable that each of the particles be coated completely with catalyst, the practicalities of manufacturing the resistance element may cause the particles to only be partially coated. Even such partial coating greatly increases the surface area of catalyst available, and the term coating, as applied to the catalyst, is to be interpreted to include such partial coverage.

For the particular elements described in the preferred embodiments, a catalytic layer thickness of from about 100 to about 500 microns porduces an optimum combination of maximum catalytic surface area and minimum usage of catalyst. For resistance elements of different sizes, or different particle sizes, layers of different thicknesses may be utilized when the particular application requires, while still following the method of the present invention in providing the layer and the element structure claimed herein.

The invention claimed is:

1. A catalytic combustion resistance element comprising a ceramic coated wire over which a catalytic layer is formed, in which the catalytic layer comprises individual particles of a powdered oxide selected from the class of oxides consisting of alumina and beryllia, each of said particles being individually coated with a metallic catalyst, said powdered particles being of an average size of about one micron, and binder agent means attaching the individual catalyst coated oxide particles to one another so as to form a porous outer layer of the catalyst coated particles.

2. The element of claim 1, and in which the catalytic layer has a thickness of from about 100 to about 500 microns.

3. The element of claim 1, and in which the catalyst is essentially platinum and the binder agent means is an aqueous solution of aluminum nitrate.

4. The element of claim 1, and in which the catalytic layer is formed on a glass seal which encloses the ceramic coated wire.

5. The element of claim 4, and in which the catalytic layer has a thickness of from about 100 to about 500 microns.

6. The element of claim 5, and in which the catalyst is essentially platinum and the binder agent means is an aqueous solution of aluminum nitrate.

7. The method of forming a catalytic coating on a combustion type ceramic coated wire resistance comprising:
   mixing a powder comprising particles of an oxide selected from the class of oxides consisting of aluminum and beryllium oxide with a solution of a compound of the catalyst, which compound decomposes upon heating to produce the catalyst;
   heating the resultant mixture so as to evaporate the solution, decompose the compound to the catalyst and coat the oxide powder particles with the catalyst to produce a dried powder of catalytically coated particles;
   mixing said catalytically coated particles with a liquid binder medium to form a second mixture;
   applying the second mixture to the resistance element to form a coating thereon; and
   drying the coating to evaporate the liquid from the second mixture so that the binder medium and the catalytically coated particles of the powder form a porous outer catalytic layer.

8. The method of claim 7, and in which the compound of the catalyst is chloroplatinic acid.

9. The method of claim 7, and in which the steps of combining the catalytic compound and oxide particles and heating the resultant mixture are repeated in sequence a plurality of times prior to mixing with the binder medium.

10. The method of claim 7, and in which the binder medium is an aqueous solution of a nitrate of the same metal as the oxide.

11. The method of claim 7, and in which the second mixture is repetitively applied to the element so as to form an outer layer of from about 100 to about 500 microns in thickness.

12. The method of claim 7, and including selecting the size of the oxide particles, prior to their combination with the catalytic compound, to have an average size of about one micron.

13. The method of claim 12, and in which the compound of the catalyst is chloroplatinic acid.

14. The method of claim 13 and including the steps of combining the chloroplatinic acid and oxide particles and heating the resultant mixture are repeated in sequence a plurality of times prior to mixing with the binder medium.

15. The method of claim 14 and in which the binder medium is an aqueous solution of aluminum nitrate.

16. The method of claim 15 and in which the second mixture is repetitively applied to the element so as to form an outer layer of from about 100 to about 500 microns in thickness.

* * * * *